US011760235B2

(12) United States Patent
Albert et al.

(10) Patent No.: US 11,760,235 B2
(45) Date of Patent: Sep. 19, 2023

(54) FITTING FOR A VEHICLE SEAT

(71) Applicant: Keiper Seating Mechanisms Co., Ltd., Shanghai (CN)

(72) Inventors: Kirubaharan Albert, Burscheid (DE); Grit Scholz, Remscheid (DE); Daniel Huebner, Leverkusen (DE); Dieter Henkel, Remscheid (DE); Balaji Paramasivam, Leverkusen (DE); Arkadius Rock, Solingen (DE); Rolf Schueler, Heiligenhaus (DE); Mothanna Yasen, Wermelskirchen (DE); Thomas Dill, Heilgenmoschel (DE); Christian Wolf, Dielkirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 22 days.

(21) Appl. No.: 17/755,386

(22) PCT Filed: Oct. 26, 2020

(86) PCT No.: PCT/EP2020/079986
§ 371 (c)(1),
(2) Date: Apr. 28, 2022

(87) PCT Pub. No.: WO2021/083818
PCT Pub. Date: May 6, 2021

(65) Prior Publication Data
US 2022/0402407 A1 Dec. 22, 2022

(30) Foreign Application Priority Data

Oct. 31, 2019 (DE) ..................... 10 2019 129 530.0
Aug. 21, 2020 (DE) ..................... 10 2020 121 921.0

(51) Int. Cl.
*B60N 2/225* (2006.01)

(52) U.S. Cl.
CPC ......... *B60N 2/2251* (2013.01); *B60N 2/2254* (2013.01)

(58) Field of Classification Search
CPC ..... B60N 2/225; B60N 2/2251; B60N 2/2254
(Continued)

(56) References Cited

U.S. PATENT DOCUMENTS 5,588,932 A * 12/1996 Lindblad .............. B60N 2/2251
   475/341
5,704,870 A * 1/1998 Shephard ............. B60N 2/2251
   475/342
(Continued)

FOREIGN PATENT DOCUMENTS

CN    1516653 A  *  7/2004
CN  113939428 A  *  1/2022
(Continued)

OTHER PUBLICATIONS

European Patent Office, International Search Report and Written Opinion in Application No. PCT/EP2020/079986, dated Feb. 2, 2021, 10 pages, Rijswijk Netherlands.

*Primary Examiner* — Hilary L Gutman
(74) *Attorney, Agent, or Firm* — Marshall & Melhorn, LLC

(57) ABSTRACT

A fitting for a vehicle seat may have a first ring gear having first ring gear teeth, a second ring gear having second ring gear teeth, and a planet gear mounted on a planet carrier and which meshes with the first and second ring gear teeth. A blocking planet gear, which can be rotated about a blocking-planet-gear axis of rotation, permanently meshes with the first ring gear teeth and with the second ring gear teeth, and the distance between the blocking-planet-gear axis of rotation and the axis can be changed so that the blocking planet gear can be transferred selectively between locking meshing and non-locking meshing with the first ring gear teeth and/or (Continued)

with the second ring gear teeth. A vehicle seat having a seat part, a backrest and a fitting of this type for setting an angle of inclination of the backrest is provided.

15 Claims, 6 Drawing Sheets

(58) Field of Classification Search
 USPC .................................................. 296/65.16
 See application file for complete search history.

(56) References Cited

U.S. PATENT DOCUMENTS

| | | | | |
|---|---|---|---|---|
| 2003/0080599 A1* | 5/2003 | Hohn | .................. | B60N 2/2251 |
| | | | | 475/331 |
| 2004/0251727 A1* | 12/2004 | Beneker | ............... | B60N 2/2251 |
| | | | | 297/362 |
| 2007/0029893 A1* | 2/2007 | Schuler | .................. | B60N 2/225 |
| | | | | 310/239 |
| 2014/0346832 A1 | 11/2014 | Jung et al. | | |
| 2016/0038313 A1* | 2/2016 | Kim | .......................... | B25J 9/104 |
| | | | | 623/24 |
| 2016/0038368 A1* | 2/2016 | Lee | ...................... | A61H 1/0244 |
| | | | | 623/24 |
| 2022/0219578 A1* | 7/2022 | Scholz | ..................... | B60N 2/02 |

FOREIGN PATENT DOCUMENTS

| | | | |
|---|---|---|---|
| DE | 1555711 A1 | | 10/1969 |
| DE | 10327090 A1 | * | 12/2004 |
| DE | 10327090 A1 | | 12/2004 |
| DE | 102011113747 A1 | * | 3/2013 |
| EP | 2982482 A1 | * | 2/2016 |
| EP | 2982482 A1 | | 2/2016 |
| WO | WO-0144009 A1 | * | 6/2001 |
| WO | WO-2013037550 A1 | * | 3/2013 |
| WO | WO-2020229359 A1 | * | 11/2020 ........... B60N 2/2227 |

* cited by examiner

FITTING FOR A VEHICLE SEAT

FIELD

The invention relates to a fitting for a vehicle seat, in particular a backrest adjuster, having a first ring gear having a first ring gear toothing, a second ring gear which has a second ring gear toothing and is mounted so as to be rotatable relative to the first ring gear about an axis, and at least one planet gear which is mounted on a planet carrier so as to be rotatable eccentrically to the axis and meshes with the first ring gear toothing and the second ring gear toothing, wherein by rotating the planet carrier about the axis the at least one planet gear is able to roll in the first ring gear toothing and in the second ring gear toothing, as a result of which the first ring gear and the second ring gear are rotatable relative to one another about the axis. The invention moreover relates to a vehicle seat.

BACKGROUND

An articulated fitting for an adjustment device of a motor vehicle seat is known from DE 103 27 090 A1, said articulated fitting having a first articulated arm which is connected to an outer gear with an internal toothing, having a second articulated arm which is connected to a second outer gear with an internal toothing and is adjustable relative to the first articulated arm about an articulation axis, having at least two planet gears which mesh in each case with the first outer gear as well as with the second outer gear and are in each case disposed so as to be rotatable about a planet gear axis, and having a driving sprocket which meshes with the at least two planet gears. A carrier which is disposed so as to be rotatable about the articulation axis is provided. A first planet gear of the at least two planet gears is rotatable on this carrier and disposed so as to be movable relative to the carrier. A compensation device which is disposed between the carrier and the first planet gear and has an elastic means which preloads the first planet gear in terms of meshing with the two outer gears is provided.

A double fitting for a vehicle seat is known from DE 2014 208 852 B4, said double fitting having two fittings which are operatively connected to one another, wherein each of the two fittings has a first fitting part and a second fitting part which can be twisted relative to one another so as to be slanted about an axis, wherein the first fitting part and the second fitting part are connected to one another by gears. When the double fitting is used for adjusting the backrest inclination, the movement of the backrest is not concentric with a lower part fixed to the seat but is correspondingly slanted.

SUMMARY

The invention is based on the object of improving a fitting, in particular a backrest adjuster, of the type mentioned at the outset. The intention is in particular to provide a high-strength fitting which can be continuously, that is to say infinitely, adjusted and, as a result, can be driven in a motorized manner. The fitting is to enable, in particular, a rotating rather than a slanted adjustment. The fitting is in particular to be suitable for use in electrified backrests of rear seats which have a large adjustment range (preferably from a horizontal forward position to a horizontal rear a position), which is in particular adjustable electrically by remote control or a mobile phone app, and require adjustment speeds that are faster than comfort adjustments.

The invention is moreover based on the object of providing a corresponding vehicle seat.

This object is achieved according to the invention by a fitting for a vehicle seat, in particular a backrest adjuster, having a first ring gear having a first ring gear toothing, a second ring gear which has a second ring gear toothing and is mounted so as to be rotatable relative to the first ring gear about an axis, and at least one planet gear (running planet) which is mounted on the planet carrier so as to be rotatable eccentrically to the axis and meshes with the first ring gear toothing and the second ring gear toothing, wherein by rotating the planet carrier about the axis the at least one planet gear is able to roll in the first ring gear toothing and in the second ring gear toothing, as a result of which the first ring gear and the second ring gear are rotatable relative to one another about the axis, wherein at least one interlocking planet gear which is rotatable about an interlocking planet gear rotation axis permanently meshes with the first ring gear toothing and permanently meshes with the second ring gear toothing, and a spacing between the interlocking planet gear rotation axis and the axis is variable in such a manner that the at least one interlocking planet gear is selectively transferable between a locking gear mesh and a non-locking gear mesh with the first ring gear toothing and/or the second ring gear toothing.

As a result of at least one interlocking planet gear which is rotatable about an interlocking planet gear rotation axis permanently meshing with the first ring gear toothing and with the second ring gear toothing, and a spacing between the interlocking planet gear rotation axis and the axis being variable in such a manner that the at least one interlocking planet gear is selectively transferable between a locking gear mesh and a non-locking gear mesh with the first ring gear toothing and/or the second ring gear toothing, the fitting can be unlocked and locked by means of the at least one interlocking planet gear, the actual adjustment function being performed by the planet gears.

The fitting can have a plurality of planet gears. The fitting can have a plurality of interlocking planet gears. The fitting can have a plurality of planet gears and the very same number of interlocking planet gears. The fitting can have exactly three planet gears. The fitting can have exactly three interlocking planet gears.

The fitting can have exactly three planet gears and exactly three interlocking planet gears.

A tooth count difference between a tooth count of the first ring gear toothing and a tooth count of the second ring gear toothing can correspond to the number of planet gears or a multiple thereof. A tooth count difference between a tooth count of the first ring gear toothing and a tooth count of the second ring gear toothing is preferably three, or a multiple of three.

The at least one interlocking planet gear can be integral with an axially continuous toothing. In this instance, the tooth count difference between the first ring gear toothing and the second ring gear toothing is preferably double the number of planet gears (running planets).

The at least one interlocking planet gear can preferably have a first gear wheel and a second gear wheel, wherein the first gear wheel and the second gear wheel are disposed so as to be axially next to one another and are connected to one another in a rotationally fixed manner. In this instance, the tooth count difference between the first ring gear toothing and the second ring gear toothing is preferably identical to the number of planet gears. The first gear wheel can permanently mesh with the first ring gear toothing, and the second gear wheel can permanently mesh with the second ring gear toothing.

The at least one interlocking planet gear by means of a control means can be movable, counter to the force of an energy storage unit, from the locking gear mesh to the non-locking gear mesh. The at least one interlocking planet gear can be held in the locking gear mesh by the control means, in particular in that the control means has an eccentric contour.

A rotatably mounted driver can interact with the control means and the planet carrier in such a manner that a rotation of the driver from a central position initially causes a rotation of the control means and, as a result, the at least one interlocking planet gear to be transferred to the non-locking gear mesh and subsequently, upon further rotation of the driver, causes a rotation of the planet carrier.

In the locking gear mesh of the at least one interlocking planet gear, a toothing of the at least one interlocking planet gear can contact the first ring gear toothing at at least two contact points, preferably at more than two contact points, preferably at four contact points and/or contact the second ring gear toothing at at least two contact points, preferably at more than two contact points, preferably at four contact points. The number of contact points can be reducible by decreasing the spacing between the interlocking planet gear rotation axis and the axis, in particular by transferring the at least one interlocking planet gear to the non-locking gear mesh.

The tooth flanks of the toothings of the at least one interlocking planet gear can be conceived in such a manner that, in the locking gear mesh of the at least one interlocking planet gear, neither the first ring gear toothing nor the second ring gear toothing can exert on the interlocking planet gear a force component in the direction of the axis.

The object is moreover achieved by a vehicle seat having a seat part, a backrest and at least one fitting according to the invention. The fitting preferably serves for adjusting an inclination angle between the seat part and the backrest, but may enable other adjustment functions such as, for example, a seat height adjustment and a seat cushion inclination adjustment.

Summarizing, and in other words, the core concept of the invention lies in separating the overall task of an "excellent adjustment function with simultaneously increased load-bearing capability" into different sub-tasks or active principles. The fitting according to the invention meets both sub-tasks ("excellent adjustment function" and "high load-bearing capability") in an optimal manner. Proposed is a planetary gear train, in particular a Wolfrom gearbox without a sun gear, having a ring gear fixed to the seat part and a ring gear fixed to the backrest, said ring gears having different tooth counts. A tooth count difference preferably corresponds to the number of planets, or a multiple thereof. One planet carrier mounts, for example, three running planets (planet gears) and three interlocking planets (interlocking planet gears), the interlocking planet gears being radially displaceable. The terms planet gear and running planet are used as synonyms. The planet gears which absorb the adjustment forces and guarantee the adjustment function are provided for the function "excellent adjustment function". To this end, the planet gears have an optimal toothing and mounting for smooth running and high efficiency. The planet gears are mounted in the planet carrier so as to have an optimal running axle spacing. However, the latter would have the effect that the gearbox in the interlocked state would have excessive play. Therefore, interlocking planet gears have been provided according to the invention. The latter in the running state are retained by a guideway and in the interlocked state are pushed outward into the ring gear toothing(s) while being radially loaded by a spring. The interlocking planet gears in the ring gear toothing(s) interlock as a result of an especially "deficient" toothing which by way of contact between the teeth at a plurality of locations prevents rolling so that the planet gears are blocked.

In order to prevent radial yielding under load, an eccentric contour, for example in the form of a control guideway, which is able to be brought out of contact during adjustment, is used. This eccentric contour in the interlocked state can have a contour which lies so as to be tangentially centric below the interlocking planet, and thus be directly connected to a driver. The eccentric contour can preferably be moved away from below the interlocking planet gear in both rotating directions of the motor. Alternatively, the eccentric contour can have a tensioning contour for taking up play. When the fitting is adjusted, the eccentric contour is first driven by the driver, as a result of which the interlocking planet axles are released. A control means, in particular a guideway disk, can move the interlocking planet gears radially inward to a running axle spacing. The planet carrier is subsequently driven, and the adjustment of the fitting (mutual twisting of the ring gears) begins. In order to achieve the desired gear ratio, the planet gears can be axially divided into two gear wheels which are connected to one another in a rotationally fixed manner. The planet gears can mesh in two ring gear toothings, the latter having a tooth count difference of three instead of six, for example.

In one preferred embodiment, self-locking or blocking, respectively, of the interlocking planet gears is achieved by a special tooth tip geometry, wherein the tooth flanks, after the interlocking planet gears have settled thereon, have an angle of zero degrees in relation to the radial direction of movement of the interlocking planet gears and therefore do not experience any evicting force. Interlocking the interlocking planet gears, for example with an eccentric, can be dispensed with in this case.

The object described at the outset is achieved by a fitting according to the invention. Moreover, the invention provides a fitting which can in particular also be used in autonomously driving vehicles in which an extended adjustment range of the vehicle seats is required in order to increase the comfort available to the occupant no longer permanently driving. The fitting can advantageously be used in vehicle seats in which the belt system is completely displaced together with the vehicle seat so as to allow a shoulder belt to bear close to an occupant even in the case of a longitudinal seat position that is adjusted far toward the rear or in the case of backrests adjusted to lie flat. Belt systems of this type of which the shoulder belt is thus no longer fastened to the B-pillar, so as to be fixed to the vehicle body, but is fastened in the upper region of the backrest of a rear seat, lead to significantly higher loads in the fitting. A fitting according to the invention can withstand these loads but nevertheless requires a small installation space and has a light weight.

DESCRIPTION OF THE FIGURES

The invention is explained in more detail by means of an advantageous exemplary embodiment illustrated in the figures, and a variant of this exemplary embodiment. However, the invention is not limited to this exemplary embodiment and the variant thereof. In the figures.

DETAILED DESCRIPTION

Figure 11:
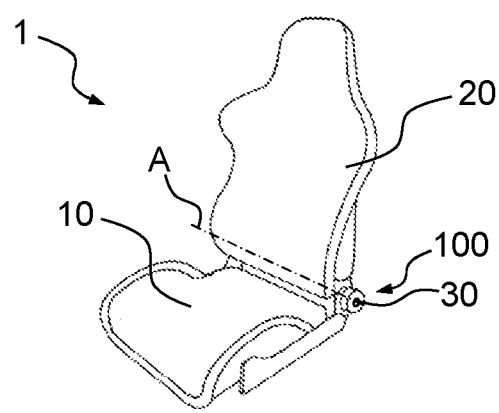
FIG. 11 schematically and perspectively shows a vehicle seat having a fitting according to the invention.

A vehicle seat 1, schematically illustrated in FIG. 11, for a motor vehicle has a seat part 10 and a backrest 20 which in terms of the inclination thereof is adjustable relative to the seat part 10. In order for the backrest 20 to be adjusted for inclination, a drive shaft 30 which is disposed horizontally in the transition region between the seat part 10 and the backrest 20 is rotated manually, for example by means of a handwheel, or in a motorized manner, for example by means of an electric motor. The drive shaft 30 on both sides of the vehicle seat 1 engages in each case in a rotationally fixed manner in one fitting 100, in particular a driver 190 of the respective fitting 100. A small freewheeling angle for compensating tolerances between the two fittings 100 can be provided in the circumferential direction of the drive shaft 30 between the drive shaft 30 and one of the two fittings 100.

The drive shaft 30 is rotatable about an axis A. The axis A defines a cylindrical coordinate system which is referred to for the directional indications used hereunder. The terms axial, radial and circumferential direction therefore relate in particular to this axis A.

The backrest 20 by means of the two fittings 100 is adjustable about the axis A, that means pivotable in an unlocked state of the fittings 100 and not pivotable in a locked state of the fittings. The two fittings 100 are preferably of identical construction, only one of the two fittings 100 being described hereunder for this reason.

In a variant of the exemplary embodiment, the vehicle seat has exactly only one fitting 100 which is disposed on one of two sides of the seat. The vehicle seat 1 in this instance has a rotary bearing on an opposite side of the seat, said rotary bearing having an axis which is in alignment with the axis A of the exactly one fitting 100. In a variant of the exemplary embodiment, a vehicle seat designed as a rear seat of a second or third seat row has more than two fittings 100. The more than two fittings 100 can be combined with one or a plurality of rotary bearings. A backrest of the vehicle seat can cover one, two or three seats and optionally have integrated belts.

The fitting 100 has a first fitting part 110 and a second fitting part 120 which in an unlocked state of the fitting 100 are rotatable relative to one another about the axis A. Once the fitting 100 is assembled, the first fitting part 110, for example, is fixedly connected to a structure of the backrest 20 of the vehicle seat 1, thus fixed to the backrest. The second fitting part 120 in this instance is fixedly connected to the structure of the seat part 10, thus fixed to the seat part. The allocations of the fitting parts 110, 120 can however also be reversed, i.e. in this instance the first fitting part 110 would be fixed to the seat part, and the second fitting part 120 would be fixed to the backrest. The fitting 100 lies in the force flux between the backrest 20 and the seat part 10, the two fitting parts 110, 120 for this reason preferably being made from metal, preferably from steel.

The first fitting part 110 has a first ring gear 112 having a first ring gear toothing 114. The second fitting part 120 has a second ring gear 122 having a second ring gear toothing 124. A tooth count difference between a tooth count of the first ring gear toothing 114 and a tooth count of the second ring gear toothing 124 in the present case is three. The fitting 100, by virtue of the tooth count difference of three, has exactly three locations where in each case one tooth of the first ring gear toothing 114 and one tooth of the second ring gear toothing 124, when viewed in the circumferential direction, are in exact mutual alignment. By virtue of the tooth count difference, the teeth which lie in each case therebetween are mutually displaced in the circumferential direction, wherein the displacement is the greatest in the center between two teeth pairs which are each in alignment.

The two fitting parts 110, 120 can in each case be approximately inscribed in a circular disk shape, said fitting parts in the region of the external faces thereof each having geometries, in particular shoulders, for fastening to the seat part 10, or to the backrest 20, respectively. A clasp ring 130 is provided for absorbing the axially acting forces, thus for holding together the fitting parts 110, 120. The preferably metallic clasp ring 130 has a hollow-cylindrical portion which, on the one hand, is fixedly connected, in the present case welded, to an external periphery of the first fitting part 110. On the other hand, the clasp ring 130, by means of a periphery pointing radially inward, engages across the second fitting part 120 in a radially outer region of the second fitting part 120 without impeding the relative rotation of the two fitting parts 110, 120, the second fitting part 120 being movable relative to the first fitting part 110 and the clasp ring 130. The two fitting parts 110, 120, conjointly with the clasp ring 130, form a disk-shaped unit.

The fitting 100 is configured as a planetary gearbox. The fitting 100 has three planet gears 140 having in each case one planet gear toothing 142 for adjusting the fitting 100, and three interlocking planet gears 150 for fixing (locking) the fitting 100.

Each of the three planet gears 140 is mounted on a common planet carrier 160 so as to be rotatable about in each case one planet gear rotation axis D1. The three planet gear rotation axes D1 are distributed uniformly across the circumference, i.e. in the present case disposed so as to be mutually offset by 120°. The interlocking planet gears 150 are rotatable about in each case one interlocking planet gear rotation axis D2 and mounted so as to be radially displaceable on the planet carrier 160.

The three interlocking planet gear rotation axes D2 are distributed uniformly across the circumference, i.e. in the present case disposed so as to be mutually offset by 120°. When viewed in the circumferential direction, one of the three interlocking planet gears 150 is in each case disposed so as to be centric between two planet gears 140 such that the arrangement of the planet gears 140 is rotated by 60° in relation to the arrangement of the interlocking planet gears 150.

The three planet gears 140 are in each case mounted so as to be rotatable on one of three bearing pins 170, a bearing bush 172 being in each case disposed therebetween. Each of the three bearing pins 170 has axial stages and, so as to be axially centric, has a receptacle region 174 for one of the three planet gears 140, or one of the three bearing pins 172, respectively. Axially next to the receptacle region 174, each of the three bearing pins 170 on both sides has a stud 176. The diameters of the studs 176 are smaller than a diameter of the receptacle region 174. In each case, one stud 176 of each of the bearing pins 170 is inserted, preferably press-fitted or riveted, into one of three corresponding openings 162 in the planet carrier 160. The respective other stud 176 of each of the bearing pins 170 in the present case is inserted, preferably press-fitted, into one of three corresponding openings 162 of a planet carrier flange 164. The three planet gears 140 are thus disposed between the planet carrier 160 and the planet carrier flange 164.

The studs 176 of the planet gears 140 form the three planet gear rotation axes D1. The planet gear rotation axes D1 are in each case disposed at a defined, invariable spacing s1 from the axis A. The planet gear rotation axes D1 here are disposed in such a manner that the planet gear toothings 142 mesh with the first ring gear toothing 114 as well as with the second ring gear toothing 124 in, in particular in an optimal manner for adjusting the fitting 100. A rotation of the planet carrier 160 about the axis A causes the three planet gears 140 to roll in the two ring gears 112, 122. By virtue of the tooth count difference between the ring gear toothings 114, 124, a relative rotation occurs between the first ring gear 112 and the second ring gear 120, and thus between the first fitting part 110 and the second fitting part 120, so that the fitting by means of a rotation of the planet carrier 160 is adjustable by way of a reduction gear ratio.

Each of the three interlocking planet gears 150 has in each case one first gear wheel 152 and one second gear wheel 154, wherein the first gear wheel 152 and the second gear wheel 154 are disposed so as to be axially next to one another and are connected to one another in a rotationally fixed manner. The first gear wheel 152 preferably has a toothing 153 with the same tooth count as a toothing 155 of the second gear wheel 154, but the toothings 153, 155 are disposed so as to be mutually twisted (displaced), preferably disposed so as to be mutually twisted by half a tooth width. In a variant of the exemplary embodiment, the tooth counts of the toothings 153, 155 can also deviate from one another, for example in a manner analogous to the tooth count difference of the ring gear toothings 114, 124.

The first gear wheel 152 permanently meshes with the first ring gear toothing 114 of the first ring gear 112, and the second gear wheel 154 permanently meshes with the second ring gear toothing 124 of the second ring gear 122. The two gear wheels 152, 154 are in each case conjointly rotatable about the assigned interlocking planet gear rotation axis D2, wherein the interlocking planet gear rotation axes D2 are mounted on the planet carrier 160 and the planet carrier flange 164 so as to be radially displaceable in a limited manner. As a result, the interlocking planet gears 150 are guided in a displaceable manner between a locking gear mesh with the ring gear toothings 114, 124 and a non-locking gear mesh with the ring gear toothings 114, 124.

Figure 1:
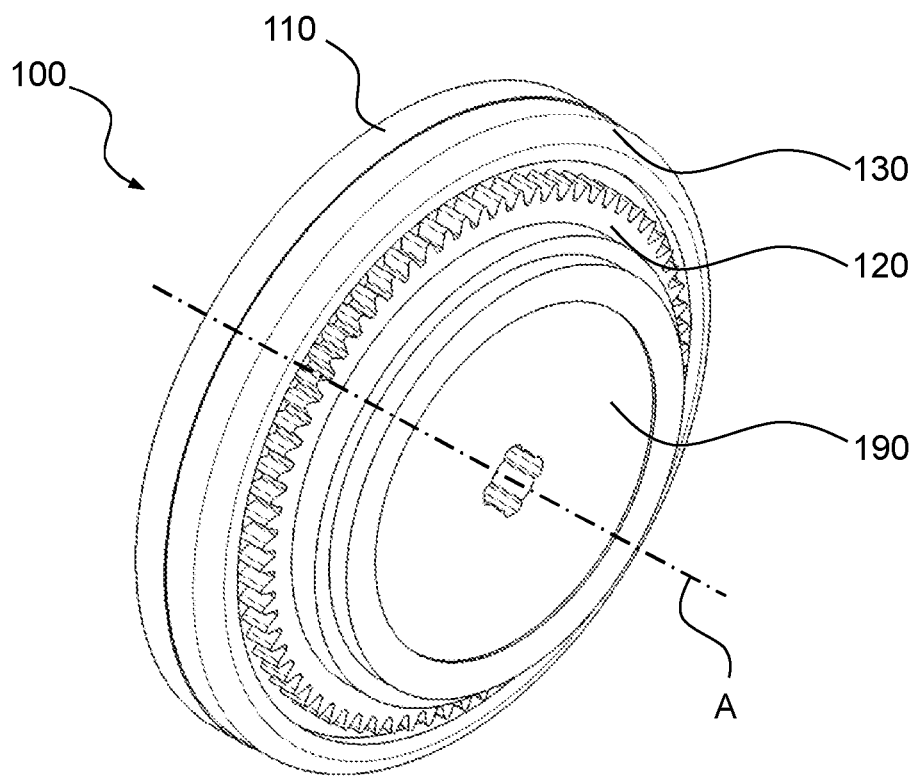
FIG. 1 shows a perspective view of a fitting according to the invention.
Figure 2:
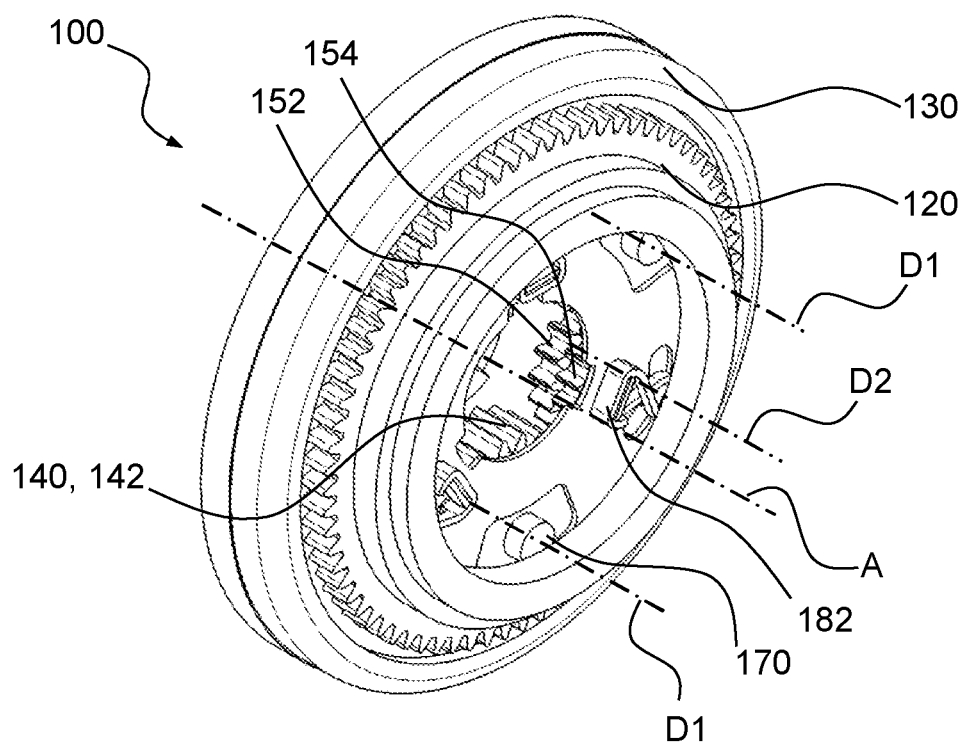
FIG. 2 shows a perspective view of the fitting from FIG. 1, wherein a driver has been removed.
Figure 3:
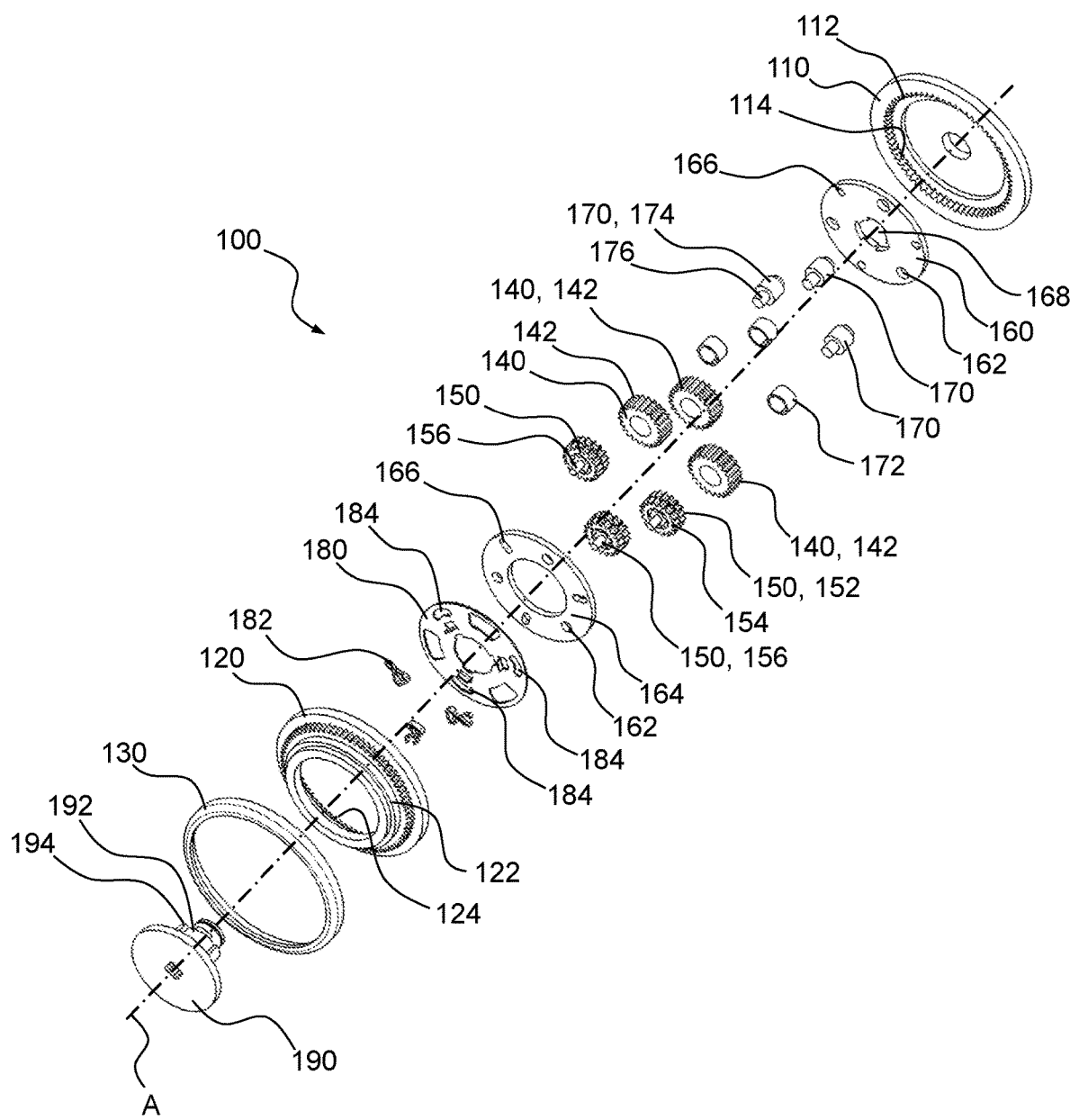
FIG. 3 shows an exploded illustration of the fitting from FIG. 1.
Figure 4:
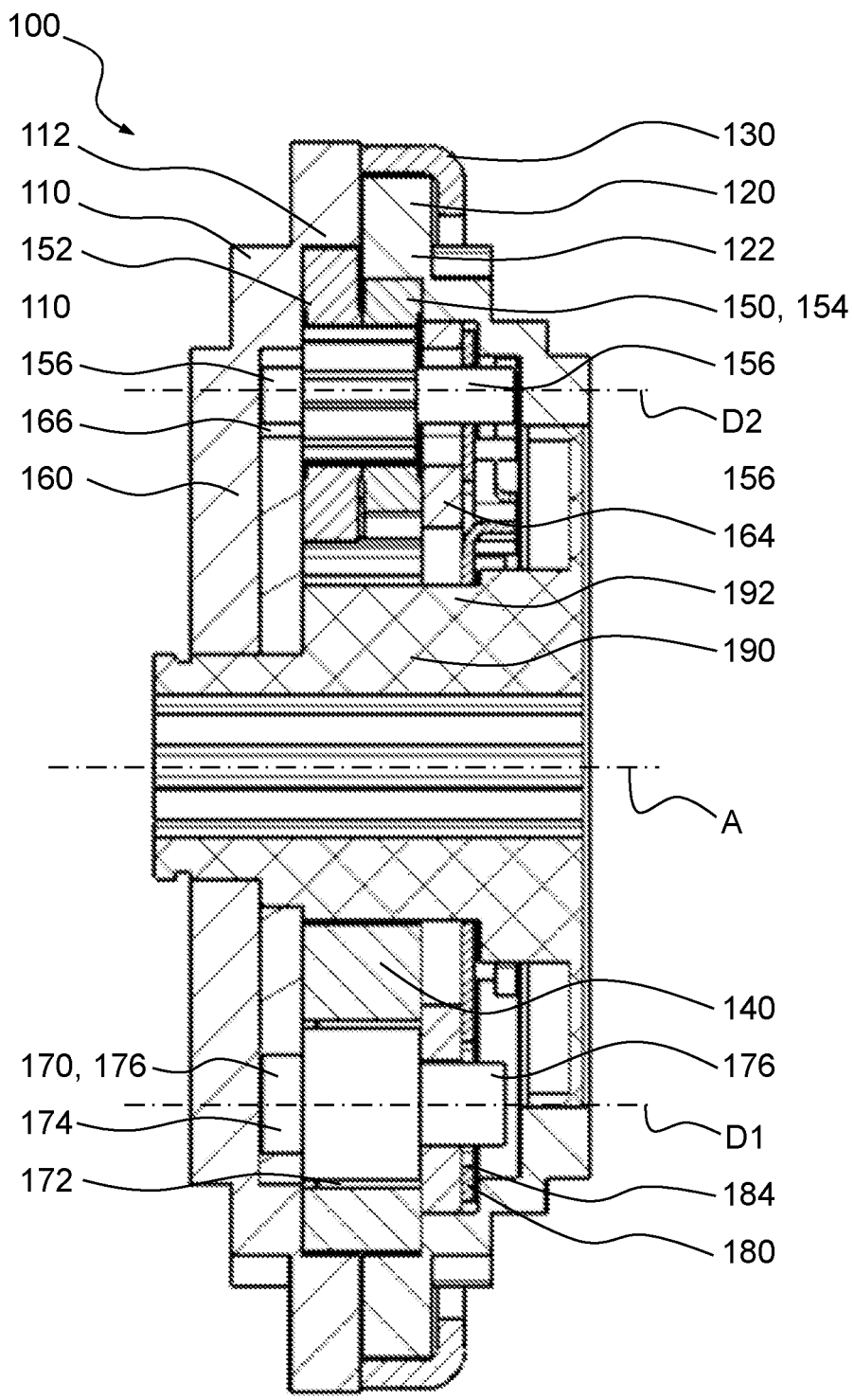
FIG. 4 shows a section through the fitting from FIG. 1.
Figure 5:
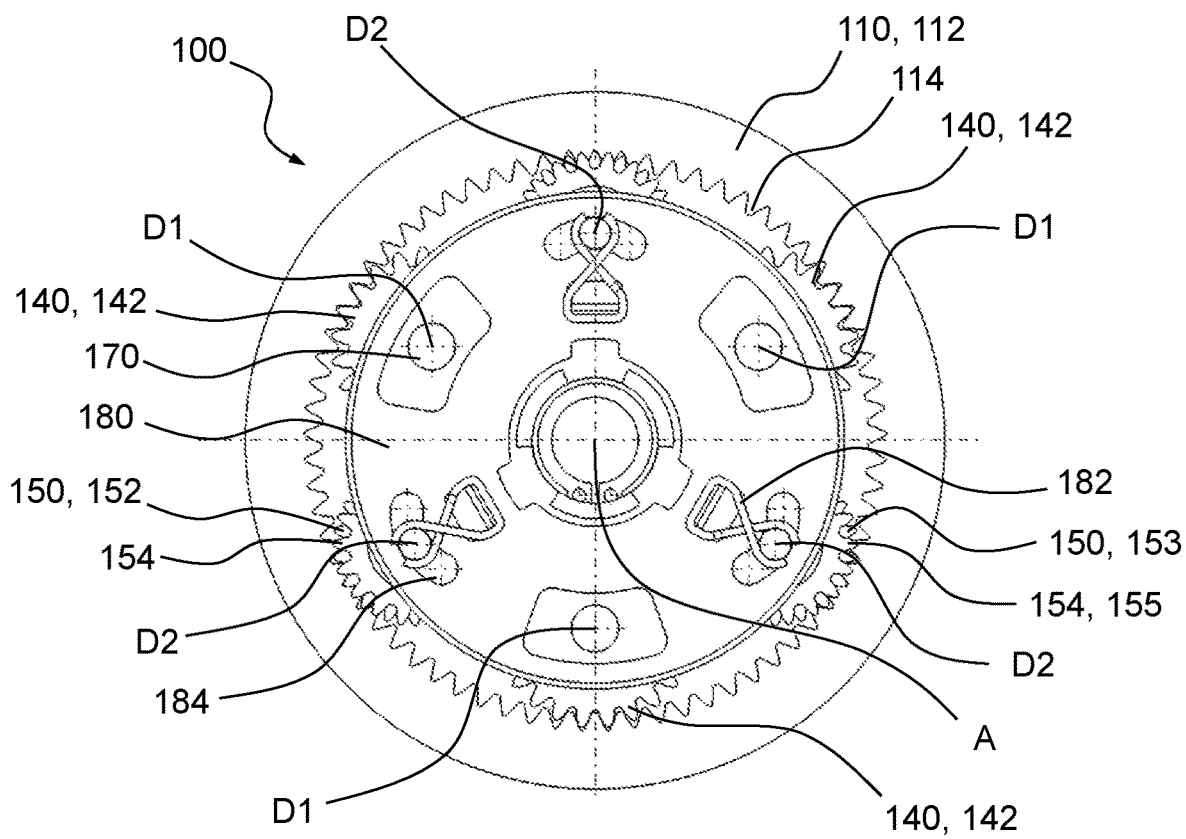
FIG. 5 shows a plan view of the fitting from FIG. 1, wherein the driver, a clasp ring and a second fitting part have been removed.
Figure 6:
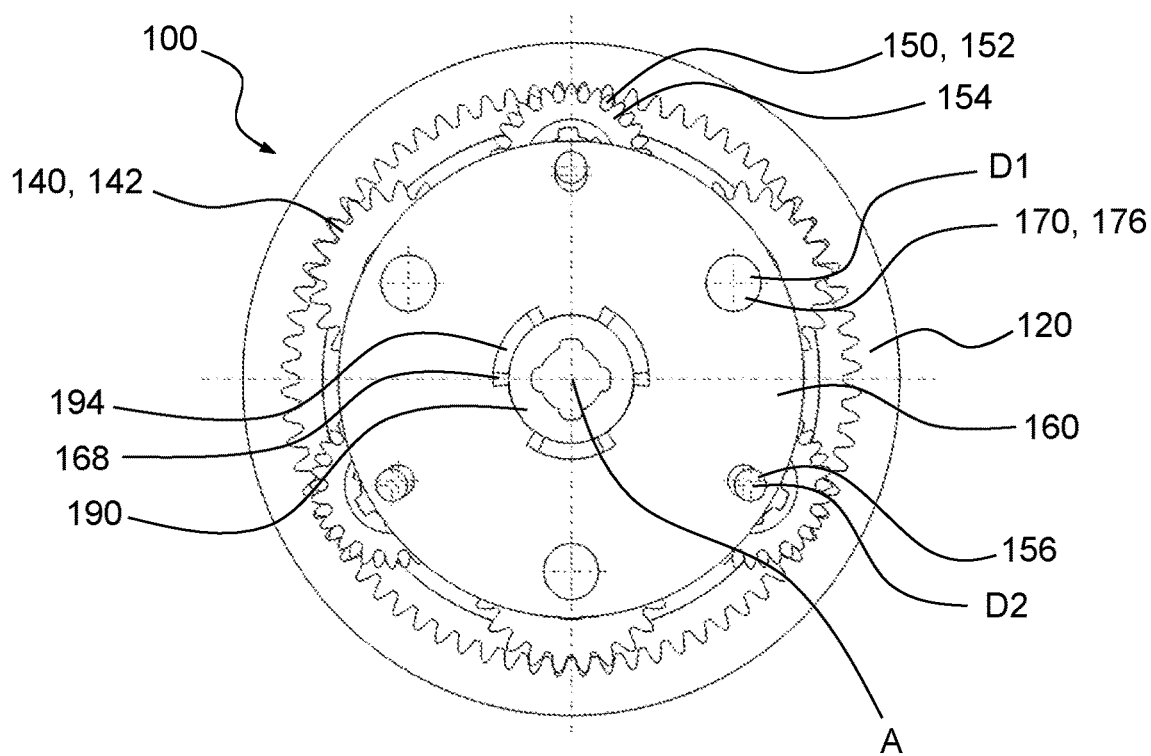
FIG. 6 shows a rear view of the fitting from FIG. 1, with an illustration of a longitudinal guide of the interlocking planets in a planet carrier, as well as an illustration of driver cams of a driver engaging with the planet carrier.
Figure 7:
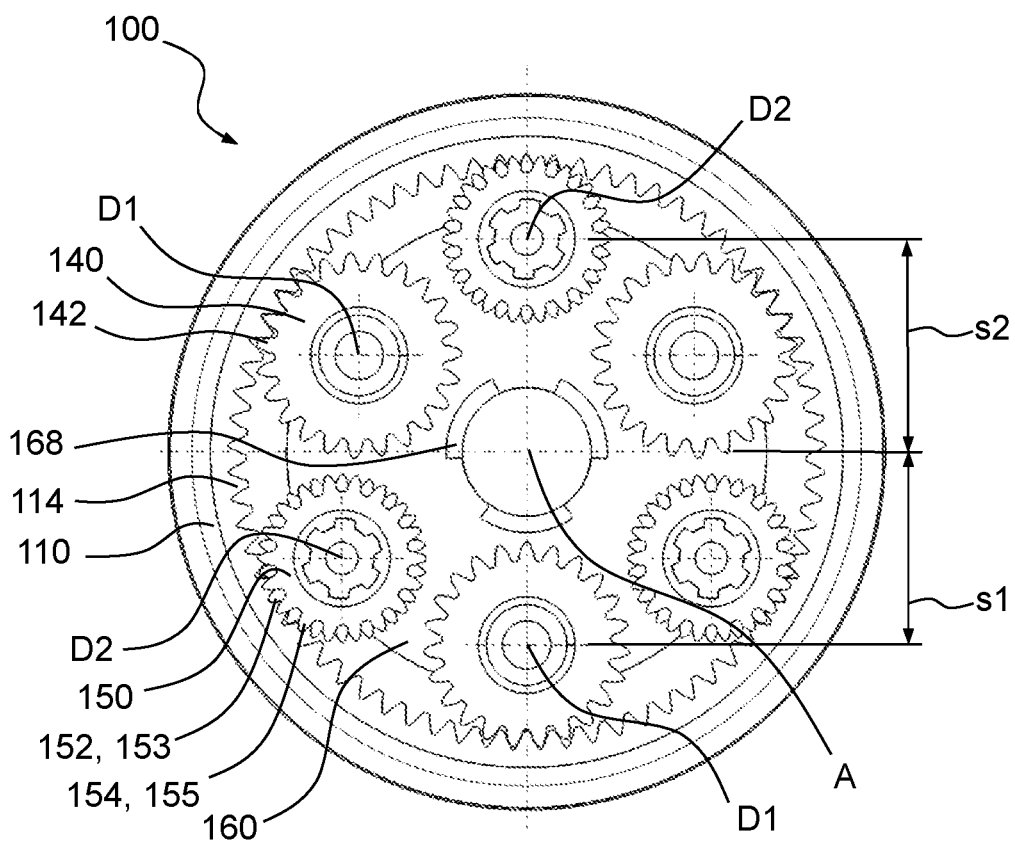
FIG. 7 shows a view corresponding to that of FIG. 5, wherein a planet carrier flange has been moreover removed.
Figure 8:
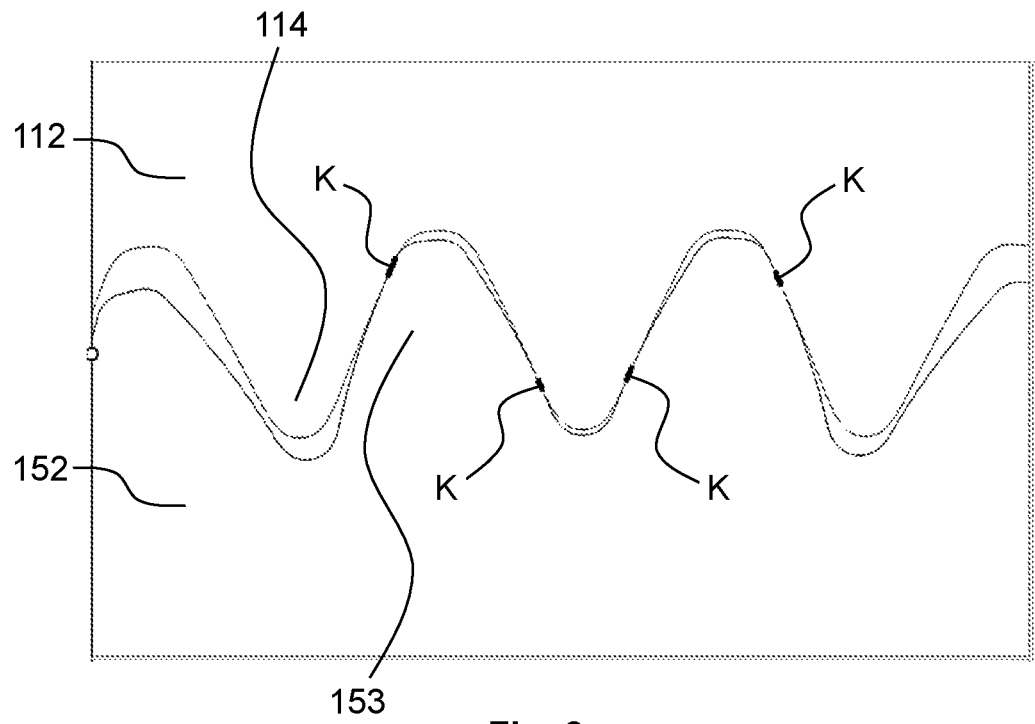
FIG. 8 shows a fragmented view of a toothing of an interlocking planet gear in a locking gear mesh (interlocking state) with a toothing of a first fitting part.

In the locking gear mesh of the gear wheels 152, 154 with the ring gear toothings 114, 124, the locking planet gears 150, by virtue of in each case one number of four contact points K between the toothings 153, 155 of the gear wheels 152, 154 and the ring gear toothings 114, 124, are not rotatable about the interlocking planet gear rotation axes D2 so that no rolling of the three interlocking planet gears 150 in the two ring gears 112, 122, and thus no relative rotation between the first ring gear 112 and the second ring gear 122, can take place. As a result, the fitting 100 is in a locked state (interlocking state) in which the first and the second fitting part 110, 120 are not rotatable relative to one another. The four contact points K between a first gear wheel 152 and the first ring gear toothing 114 are illustrated in FIG. 8.

In the non-locking gear mesh of the gear wheels 152, 154 with the ring gear toothings 114, 124, the number of contact points K between the toothings 153, 155 of the gear wheels 152, 154 and the ring gear toothings 114, 124 is reduced, in particular reduced to in each case more than one contact point K. As a result, the gear wheels 152, 154 are rollable in the ring gear toothings 114, 124 such that a relative rotation between the first ring gear 112 and the second ring gear 122 can take place by virtue of the tooth count difference between the ring gear toothings 114, 124. The fitting in this instance is in a non-locked state (running state).

The interlocking planet gears 150 have in each case on both sides one bearing journal 156. One bearing journal 156 is in each case guided so as to be radially movable in one of three radially aligned slots 166 in the planet carrier 160. The respective other bearing journal 156 of each of the interlocking planet gears 150 in the present case is guided so as to be radially movable in one of three corresponding slots 166 in a planet carrier flange 164. The three interlocking planet gears 150 are thus disposed between the planet carrier 160 and the planet carrier flange 164.

The bearing journals 156 form the three interlocking planet gear rotation axes D2, the spacing s2 of the latter from the axis A by means of a control means 180 being in each case variable in such a manner that the interlocking planet gears 150 are selectively transferable between the locking gear mesh and the non-locking gear mesh with the ring gear toothings 114, 124.

The control means 180 in this case is configured as a guideway disk on which three energy storage units 182 configured as spring elements are disposed. The control means 180 has three control guideways 184, one bearing journal 156 of each of the interlocking planet gears 150 engaging in the latter. The control means 180 is pivotable relative to the planet carrier 160 about the axis A. The control guideways 184 presently are in each case configured as slots which in each case run so as to be curved about the axis A and have control contours for interacting with the bearing journals 156 of the interlocking planet gears 150.

When the bearing journals 156, when viewed in the circumferential direction, are situated so as to be centric within the control guideways 184, the bearing journals 156 are pushed radially outward by the energy storage units 182 so far that the interlocking planet gears 150 are in the locking gear mesh with the ring gear toothings 114, 124. Optionally, the bearing journals 156 are not kept radially outside, or not only kept radially outside by the energy storage units 182, but (also) by the control guideways 184 and/or an additional eccentric means not illustrated in the figures.

As a result of a rotation of the control means 180 relative to the planet carrier 160, the control guideways 184, counter to the force of the energy storage units 182, pull the bearing journals 156 radially inward, as a result of which the interlocking planet gears 150 are transferred to the non-locking gear mesh, the fitting 100 thus being unlocked.

In order for the control means 180 to be rotated, and for the planet carrier 160 to be subsequently rotated, the fitting 100 has the driver 190 which, optionally upon travelling through an idling angle, is connectable, or connected, respectively, in a rotationally fixed manner to the drive shaft 30. Moreover, the driver 190 by way of a driver profile 192, in the present case having three axially aligned driver cams 194, is connected in a rotationally fixed manner to the control means 180. Moreover, the driver profile 192, with play in the circumferential direction, engages in a receptacle opening 168 of the planet carrier 160 which has a profile that is complementary to the driver profile 192.

In order for the fitting 100 to be unlocked and adjusted, the driver 190 is rotated by rotating the drive shaft 30 about the axis A. The driver 190 initially rotates only the control means 180, as a result of which the control guideways 184, counter to the force of the energy storage units 182, pull the bearing journals 156 radially inward, as a result of which the interlocking planet gears 150 are transferred to the non-locking gear mesh, the fitting 100 thus being unlocked. Upon travelling through the play between the driver profile 192 and the receptacle opening 168 of the planet carrier 160, the driver 190 also rotates the planet carrier 160 as a result of which a relative rotation between the first ring gear 112 and the second ring gear 122, and thus between the first fitting part 110 and the second fitting part 120, takes place.

In order for the adjustment to be completed and for the fitting 100 to be locked again, the rotation of the drive shaft 30, and thus of the driver 190, is terminated. The energy storage units 182 push the interlocking planet gears 150 radially outward. The bearing journals 156 here press on the control guideways 184 of the control means 180 in such a manner that the control means 180 pivots back until the bearing journals 156 within the control guideways 184 are moved radially outward, and the interlocking planet gears 150 are transferred to the locking state. Alternatively, the control means 180 is pivoted back by way of the drive shaft 30, for example in that the drive shaft 30 by way of a control unit of an electric motor is correspondingly rotated in reverse.

Figure 9:
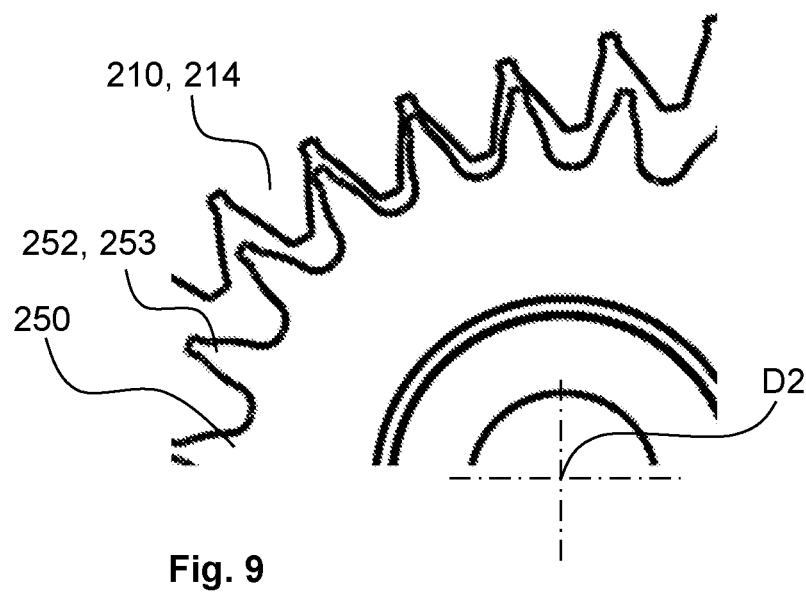
FIG. 9 shows a fragmented view of a toothing of an interlocking planet gear in a non-locking gear mesh (running state) with a ring gear toothing of a first fitting part of a variant of the fitting according to the invention.
Figure 10:
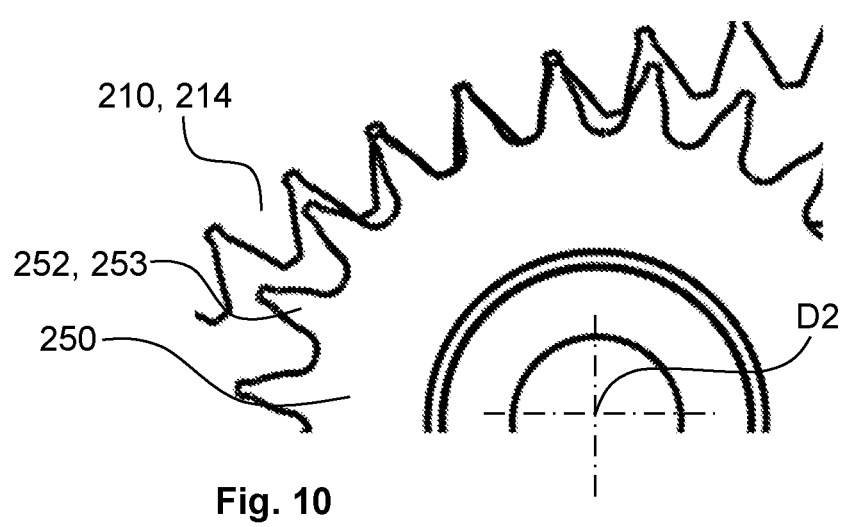
FIG. 10 shows a fragmented view of the toothing of the interlocking planet gear in a locking gear mesh (interlocking state) with the ring gear toothing of the first fitting part of the variant of the fitting according to the invention.

FIGS. 9 and 10 show a toothing of a first gear wheel 252 of an interlocking planet gear 250, and a ring gear toothing 214 of a first fitting part 210 of a variant of the exemplary embodiment. The remaining components correspond to those of the exemplary embodiment described above. FIG. 9 in fragments shows the toothing 253 in a non-locking gear mesh with the ring gear toothing 214. FIG. 10 in fragments shows the toothing 253 in a locking gear mesh (interlocking state) with the ring gear toothing 214.

Self-locking or blocking, respectively, of the interlocking planet gears 250 in the locking state is achieved by a special tooth tip geometry of the toothing 253, wherein the tooth flanks in the locking state (after the toothing 253 has "settled" into the ring gear toothing 214) in the region of the contact points between the toothing 253 and the ring gear toothing 214 have an angle of zero degrees in relation to the radial direction (direction of movement) and therefore do not experience any evicting force. Interlocking the locking state, for example by means of a control guideway and/or an eccentric means, can therefore be dispensed with.

The features disclosed in the preceding description, the claims and the figures may be of significance both individually and in combination for implementing the invention in its various refinements, to the extent that said features remain in the scope of protection of the claims.

LIST OF REFERENCE SIGNS

1 Vehicle seat
10 Seat part
20 Backrest
30 Drive shaft
100 Fitting
110; 210 First fitting part
112 First ring gear
114; 214 First ring gear toothing
120 Second fitting part
122 Second ring gear
124 Second ring gear toothing
130 Clasp ring
140 Planet gear
142 Planet gear toothing
150; 250 Interlocking planet gear
152; 252 First gear wheel
153; 253 Toothing of the first gear wheel
154 Second gear wheel
155 Toothing of the second gear wheel
156 Bearing journal
160 Planet carrier
162 Opening
164 Planet carrier flange
166 Slot
168 Receptacle opening
170 Bearing pin
172 Bearing bush
174 Receptacle region
176 Stud
180 Control means, guideway disk
182 Energy storage unit
184 Control guideway
190 Driver
192 Driver profile
192 Driver cam
A Rotation axis
D1 Planet gear rotation axis
D2 Interlocking planet gear rotation axis
K Contact point
s1 Spacing (between D1 and A)
s2 Spacing (between D2 and A)

The invention claimed is:

1. A fitting for a vehicle seat, the fitting having a first ring gear having a first ring gear toothing, a second ring gear which has a second ring gear toothing and is mounted so as to be rotatable relative to the first ring gear about an axis, and at least one planet gear which is mounted on a planet carrier so as to be rotatable eccentrically to the axis and meshes with the first ring gear toothing and the second ring gear toothing, wherein by rotating the planet carrier about the axis the at least one planet gear is rollable in the first ring gear toothing and in the second ring gear toothing, as a result of which the first ring gear and the second ring gear are rotatable relative to one another about the axis, characterized in that at least one interlocking planet gear which is rotatable about an interlocking planet gear rotation axis permanently meshes with the first ring gear toothing and permanently meshes with the second ring gear toothing, and a spacing between the interlocking planet gear axis and the axis is variable in such a manner that the at least one interlocking planet gear is selectively transferable between a locking gear mesh and a non-locking gear mesh with the first ring gear toothing and the second ring gear toothing.

2. The fitting as claimed in claim 1, wherein the fitting has exactly three planet gears.

3. The fitting as claimed in claim 1, wherein the fitting has exactly three interlocking planet gears.

4. The fitting as claimed in claim 1, wherein the at least one interlocking planet gear has a first gear wheel and a second gear wheel, wherein the first gear wheel and the second gear wheel are disposed so as to be axially next to one another and are connected to one another in a rotationally fixed manner, and the first gear wheel permanently meshes with the first ring gear toothing and the second gear wheel permanently meshes with the second ring gear toothing.

5. The fitting as claimed in claim 1, wherein a tooth count difference between a tooth count of the first ring gear toothing and a tooth count of the second ring gear toothing corresponds to the number of planet gears or a multiple thereof.

6. The fitting as claimed in claim 1, wherein the interlocking planet gear is integrally embodied.

7. The fitting as claimed in claim 6, wherein the interlocking planet gear has exactly one axially continuous toothing which permanently meshes with the first ring gear toothing and with the second ring gear toothing.

8. The fitting as claimed in claim 1, wherein the at least one interlocking planet gear via a control device is movable, counter to the force of an energy storage unit, from the locking gear mesh to the non-locking gear mesh.

9. The fitting as claimed in claim 8, wherein a rotatably mounted driver interacts with the control device and the planet carrier in such a manner that a rotation of the driver from a central position initially causes a rotation of the control device and, as a result, the at least one interlocking planet gear is transferred to the non-locking gear mesh and subsequently, upon further rotation of the driver, causes a rotation of the planet carrier.

10. The fitting as claimed in claim 1, wherein in the locking gear mesh of the at least one interlocking planet gear, a toothing of the at least one interlocking planet gear contacts the first ring gear toothing at at least two contact points and contacts the second ring gear toothing at at least two contact points, and the number of contact points is reducible by decreasing the spacing between the interlocking planet gear rotation axis and the axis.

11. The fitting as claimed in claim 10, wherein the number of contact points is reducible by transferring the at least one interlocking planet gear to the non-locking gear mesh.

12. The fitting as claimed in claim 1, wherein tooth flanks of the toothings of the at least one interlocking planet gear are conceived in such a manner that, in the locking gear mesh of the at least one interlocking planet gear, neither the first ring gear toothing nor the second ring gear toothing exerts on the interlocking planet gear a force component in the direction of the axis.

13. The fitting as claim 1, the fitting is a backrest adjuster for a vehicle seat.

14. A vehicle seat having a seat part, a backrest and at least one fitting as claimed in claim 1.

15. The vehicle seat as claimed in claim 14, wherein the fitting serves for adjusting an inclination angle between the seat part and the backrest.

* * * * *